United States Patent Office 3,267,898
Patented August 23, 1966

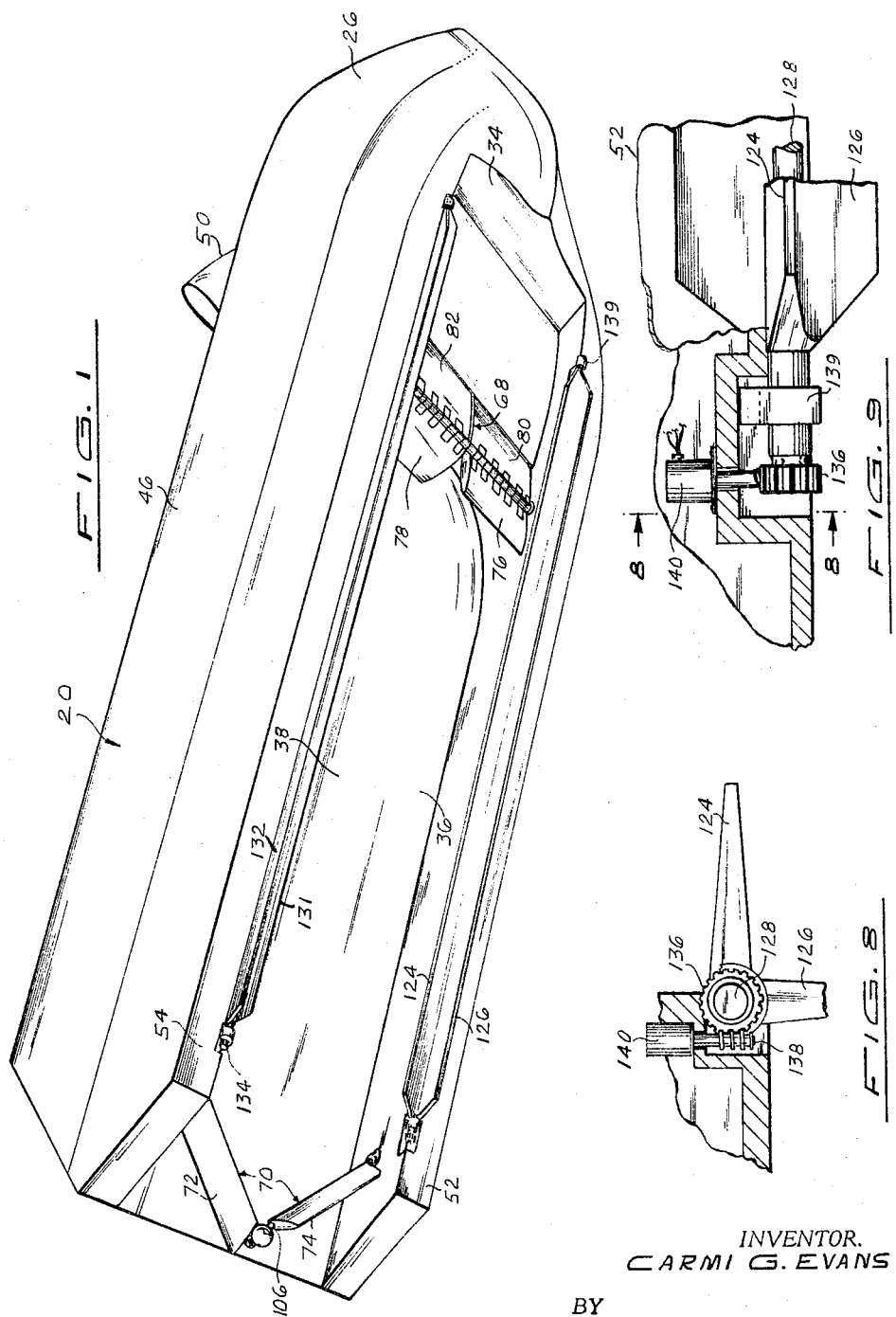

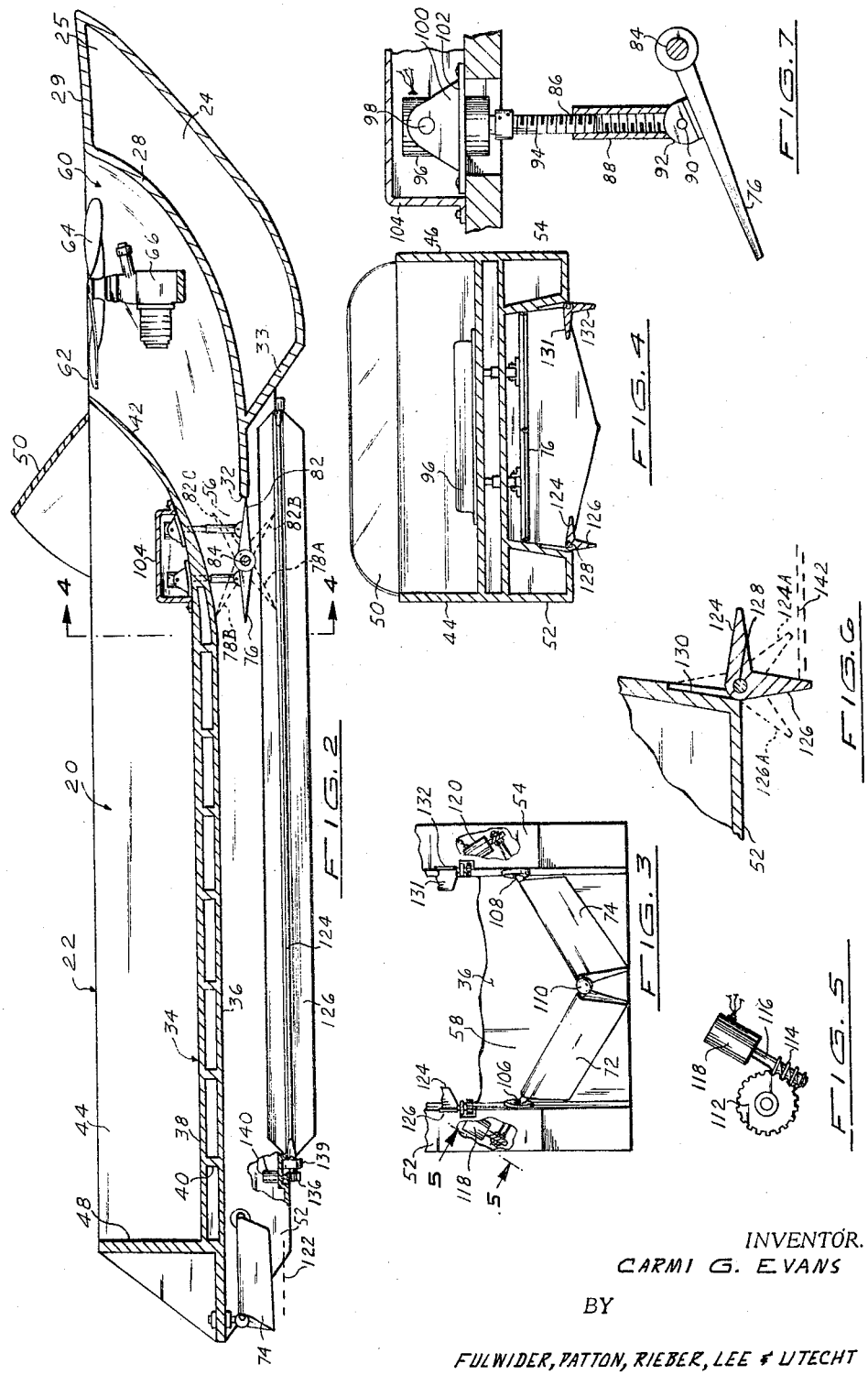

3,267,898
AMPHIBIOUS VEHICLE
Carmi G. Evans, Crestwood Apts., 7551 La Jolla Blvd.,
La Jolla, Calif.
Filed June 10, 1965, Ser. No. 462,999
12 Claims. (Cl. 114—67)

This application is a continuation-in-part of my application Serial No. 351,096, filed March 11, 1964, now abandoned.

The present invention relates to a vehicle such as a boat that floats on water, or a sled that slides on ice or snow.

The vehicle of the present invention includes a main body having an elongated floor. It is herein shown as the hull of a boat that skims over the surface of a body of water. The body includes two elongated runners which are arranged parallelly of one another and extend longitudinally of the body and below the floor to provide an elongated inverted channel.

The main body includes a section which lies forwardly of the floor and includes rear and front downwardly and rearwardly sloping walls and opposite, confronting side walls. This section is open at the top for ingress of air, and the rear is open for egress of air. The lower portion of the section is in open communication with the front of the inverted channel.

An impeller for air causes air to be drawn into the top and expelled through the rear of the section. This impeller is driven by a motor, herein shown as an internal combustion engine. Air valves are provided which can be moved for causing air to be directed rearwardly into the channel whereby the body is thrust forwardly, and can be moved to direct the air forwardly so that the body is thrust rearwardly. These air valves can be moved to a position in which they function to cause the air to act to brake movement of the vehicle. These valves can be actuated to cause more air to be moved to the right than to the left, or vice versa, whereby the turning movements of the vehicle can be controlled.

Preferably four valves are provided when they are pivotally mounted for movement about a substantially horizontally disposed axis lying transversely of the channel and are disposed at the entrance to the channel. These valve are movable independently of one another.

Rudder means are provided for directing air which cooperate with the aforementioned valves for controlling the movement of the vehicle, and for shifting the vehicle, when functioning as a boat, directly sidewise. The rudder means is in the form of two rudders that are pivotally mounted for movement independently of one another. These rudders angle rearwardly toward one another and about substantially horizontally extending axes. They also function as trimmers.

Elongated sub-runners are also provided. They extend longitudinally of the main runners and are pivotally mounted longitudinally for various cooperative positions with the main runners.

Other features and the advantages of the present invention will be apparent from the following description, reference being had to the accompanying drawings wherein a preferred embodiment of the invention is illustrated.

In the drawings:

FIG. 1 is a perspective view of the improved vehicle, showing the rear, the underside and the right side;

FIG. 2 is a longitudinally cross sectional view of the vehicle but showing the impeller and the motor therefor in elevation;

FIG. 3 is a fragmentary view of the rear of the vehicle looking upwardly, showing the rear of the channel, the rudders, parts thereof being broken away to show the mechanism for actuating the rudders;

FIG. 4 is a sectional view taken along line 4—4 of FIG. 2;

FIG. 5 is a fragmentary view taken along line 5—5 of FIG. 3;

FIG. 6 is a fragmentary sectional view of a runner and sub-runner but on a larger scale than shown in the previously mentioned figures;

FIG. 7 is a view of one of the valves and the mechanism for actuating the same;

FIG. 8 is a fragmental sectional view of the rear end of the left runner and showing the rear end of the left subrunner, and the mechanism for actuating the sub-runner is shown in elevation; and FIG. 9 is a fragmentary sectional view taken along line 8—8 of FIG. 8, but on a smaller scale.

Referring more in detail to the drawings, the vehicle is indicated at 20 in the form of a boat for floating on water, but also one that can be used, for example, as a sled. The boat includes a hull 22, the bow 24 of which is shown as hollow, including forwardly merged left side wall 25 and right side wall 26 and a rear wall 28 and a deck 29. The side walls 25 and 26 are curved and join at the rear thereof with the rear wall 28. The rear wall 28 slopes downwardly and rearwardly and terminates at 32. The bow is closed by a downwardly and forwardly sloping rear wall 33.

The hull 22 also includes a floor 34 including a lower wall 36 and an upper wall 38 spaced from one another by webs 40. A front wall 42 joins with the floor and slopes upwardly and forwardly. The side walls 25 and 26 are joined with the floor 34 and the front wall 42. The hull also includes a rear wall 48, which is joined with the floor 34 and the side walls 25 and 26. A windshield is shown at 50.

Two runners, 52 and 54, extend longitudinally of the hull and on the underside thereof, 52 being along the left edge of the hull and 54 being along the right edge. These hulls terminate at the wall 33 of the bulkhead and the front portions thereof are below the rearmost portion of the bulkhead wall 28, i.e., the forward end of the runners extend forwardly of the end 32 of the wall 28. It will also be observed that the rear end of wall 28 terminates in a plane below the plane of the floor 34 and terminates forwardly of the forward end of the floor 34 to form a passage 56 leading to the inverted channel 58, which channel is formed by the bottom wall 36 of the floor and the two runners 52 and 54.

The rear wall 28 of the bulkhead and the wall 42 of the hull together with the side walls 25 and 26, of the hull, form a section 60 which is open at the top as at 62 and the passage 56 forms the opening in the bottom. An impeller 64 is disposed at the top of the section 60 which is driven by a motor in the form of an internal combustion engine shown generally at 66. This impeller draws air into the section 60 through the open top 62 and expels the same through the passage 56 and into the tunnel 58. The air emanating from the passage 56 and impinging upon the surface underneath the hull, as for example, water, snow, or ice will force the vehicle forwardly.

Valve means 68 at the rear of passage 56 and valve means 70 at the rear of the tunnel 58 are employed for controlling the movements of the vehicle; the valve means 70 is referred to generally as "rudder means" and includes a right rudder 72 and a left rudder 74. The valve means 68 comprises four valves, a left rear valve 76, a right rear valve 78, a left front valve 80 and a right front valve 82. These valves 76, 78, 80 and 82 are pivotally mounted on a single shaft 84. Each of these valves is operated by a jack 86 in the form of an internally threaded cylinder 88 which is pivotally mounted on a pivot 90 carried by a pair of ears 92 on the top side of the valve. Each jack also includes a screw 94 which is turned by an electric motor 96 which is pivotally mounted on a shaft 98. The shaft 98 is carried by ears 100 of a block 102. These motors are housed within a housing 104. The motors are of the reversible type; when they are rotated in one direction the valves will be lifted and when rotated in the opposite direction, the valves will be lowered.

The rudders 72 and 74 are attached respectively to separate shafts 106 and 108. These shafts lie preferably in a horizontal plane extending rearwardly inwardly as is more clearly shown in FIGS. 1, 2 and 3. The rear end of these shafts is journalled in a bearing 110 while the forward end of these shafts is journalled in bearings disposed within the runners 52 and 54. The extreme rear end of these bearings has a worm gear 112 fixed thereon which is driven by a worm 114 on a shaft 116. These shafts are driven independently of one another by independent motors 118 and 120.

It is to be understood that the impeller 64 can be operated at any desired speed by controlling the speed of the internal combustion engine, as for example, controlling the throttle of the engine. When the impeller is idle, the floor of the hull rests upon the surface of the water, when the vessel is in the form of a boat and when the vessel is idle and it is functioning as a sled, the runners 52 and 54 rest on the ice or snow.

At full speed, all of the valves 76, 78, 80 and 82 are in a substantially horizontal plane and likewise, the rudders 72 and 74 will be in a substantially horizontal plane. While cruising and when it is desirable to negotiate a left turn, the motor 118 will be actuated to lower the rudder 72; when it is desired to negotiate a right turn, the motor 120 will be actuated to lower the rudder 74.

Turning movements of the vessel can be augmented by manipulating the valves 76 and 78. To augment the turning movement to the left, the valve 78 is moved downwardly and to augment the turning to the right, the valve 76 is moved downwardly. The valve 78 is shown in the augmenting position by the dotted lines 78a.

When the valves 76 and 78 are moved to the positions indicated at 78b and the valves 80 and 82 are moved to the position indicated at 82b, air emanating from the passage 56 is directed downwardly and forwardly whereby the vessel is moved rearwardly. The vessel can be moved directly sidewise to the left when the valves 76 and 80 are maintained in the position shown in full lines in FIG. 2 and when the valve 78 is moved to the position as shown at 78b and when the valve 82 is lowered to the position shown in dotted lines and indicated at 82b and the left rudder 74 is dropped into the water while the right rudder 72 is maintained in a substantially horizontal plane. Likewise, the vessel can be moved directly to the right when the valves 78 and 82 are maintained in the position shown in full lines in FIG. 2 and when valve 76 is raised to the position as shown at 78b and when the valve 80 is lowered to the position indicated at 82b and when the right rudder 72 is lowered into the water while maintaining the left rudder 74 in a substantially horizontal plane.

At cruising speed, the vessel glides in the water with the floor above the water level and thus the channel 58 together with the water forms a tunnel for the flow of air. At cruising speed the water line is approximately at the level indicated by the numeral 122 in FIG. 2. The rudders 72 and 74 can also function as trims by raising or lowering the same to maintain the vessel substantially on a horizontal plane under various load conditions.

Integrally formed vanes 124 and 126 are disposed at substantially right angles with respect to one another and are pivoted on a shaft 128 which extends parallelly of the runner 52. This shaft is disposed adjacent the rear right side of the runner 52. The runner 52 is recessed as at 130 so as to receive the vane 124 whereby the right side thereof lies flush with the right side of the runner 52. A similar pair of vanes 131 and 132 is pivotally mounted on a shaft 134 and this shaft is disposed at the extreme lower end of the left side of the right runner 54. The left side of the runner 54 is also recessed for receiving the vane 131 whereby it will lie flush with the left side of said runner. As shown in FIG. 8 and FIG. 9, each of the shafts 128 and 134, has a wormwheel 136 fixed thereto and each wormwheel is turned by a worm 138. These worms are driven by separate electric motors 140.

When the vanes are in the position shown in FIG. 6, that is, vanes 126 and 131 extend substantially vertically, they can be used as a runner for manipulation of the vessel over ice. Also, when in these positions, the vanes 126 and 132 function as extensions for the channel to materially increase the depth of the channel 58. In this manner, and by increasing the volume of air flowing through the channel, the speed of the vessel can be materially increased. Under this condition, the water level will be approximately at the line indicated at 142 in FIG. 6.

When the left vanes are moved 90° counterclockwise and the right vanes are moved 90° clockwise from the positions shown in full lines in FIG. 6, the vanes 124 and 131 bear against the runner and therefore function as braces for the vanes 126 and 132. When the vanes are moved from the position shown in full lines to the position indicated by dotted lines 126a and 124a, the vanes act as an anti-skid device, that is, they minimize sliding movement that could be imparted to the vessel as it is negotiating a curve. It is also to be understood that when the vanes are in the position shown in full lines in FIG. 6, the vanes 126 and 132 extend into the water and assure the prevention of the escape of air out of the tunnel.

By constructing the bow of the boat as herein shown and described, when the boat moves through choppy water, the bow smooths this water materially, thus preventing the jumping movement which ordinarily would be attributed to this choppy water and consequently, the bottom of the runners 52 and 54 are always partly submerged in the water, thereby preventing the escape of any air out of the tunnel. If it is desirable to increase the agitation of the water in the tunnel, to increase the thrust of the air on the water, the rear vanes 76 and 78 can be lowered slightly to perform this function. Thus, the speed of the boat can be increased by increasing the friction between the air and the surface of the water.

When the valves 80 and 82 are moved to the position shown in dotted lines at 82c, part of the air is directed rearwardly and a considerable amount of the air is directed downwardly and rearwardly, thereby causing the boat to be raised in the water, and, in this manner, the boat can be floated directly onto the beach. At this time, of course, the vanes 124 and 126 and the vanes 131 and 132 will be moved counterclockwise and clockwise 90°, respectively, from the positions shown in FIG. 4, thus exposing a wide surface to the water and sand by the bottom of the runners 52 and 54 and the bottom of the vanes 126 and 132.

When the rear valves 76 and 78 are in the position shown at 78b in FIG. 2 and the valve 82 is in the position shown in FIG. 2 and the valve 80 is in the position at 82b, the bow will move to the rght. When the rear valves 76 and 78 are in the position shown at 78b shown in FIG. 2 and the valve 80 is in the position shown at 82 in FIG. 2 and the valve 82 is moved to the position shown at 82b, then the bow will move to the left.

Thus it is apparent from the foregoing that by properly manipulating the valve system 68 and the rudder means 70, the vessel can be moved in any direction desirable. In fact, the boat can be banked when desired by moving the valves 80 and 82 to the position shown by 82 in FIG. 2 and then by lowering for example, valve 78 to the position shown at 78a, the vessel will bank as it is turned to the left.

While the form of embodiment herein shown and described, constitutes preferred form, it is to be understood that other forms may be adopted falling within the scope of the claims that follow.

I claim:
1. A vehicle such as a boat or sled, comprising in combination:
   (A) means forming a body having:
      (1) an elongated floor;
      (2) two elongated and parallelly disposed runners extending longitudinally of and below the floor to provide with the floor an elongated inverted channel;
      (3) a stationary wall sloping downwardly and rearwardly and disposed forwardly of the floor;
      (4) a second stationary wall spaced rearwardly of the stationary wall and sloping downwardly and rearwardly beyond the front portion of the first mentioned stationary wall;
      (5) confronting side walls connected with the forwardly disposed and rear walls, said forwardly disposed, rear and side walls forming a section having an opening at the top for the ingress of air and having an opening at the rear for expelling air into the front end of the channel;
   (B) means for motivating the vehicle comprising an impeller for forcing air through said section;
   (C) a motor for actuating the impeller;
   (D) valve means immediately adjacent the rear opening of the section, said valve means being movable to a position for directing air, which emanates from said section, rearwardly, and, movable to a position for directing air, which emanates from said section, forwardly;
   (E) and means for moving the valve means to either of said positions.
2. A vehicle as defined in claim 1, characterized in that the valve means (D) includes:
   (1) two valve sections;
   (2) means for pivotally supporting said valve sections; and further characterized in that said means (E) for controlling the valve sections includes:
   (1) mechanism for moving the valve sections independently of one another.
3. A vehicle as defined in claim 2, characterized in that one of said valve sections is movable to a position for directing air emanating from the first mentioned section rearwardly toward the channel and movable to another position for directing air emanating from the first mentioned section forwardly, and the other of said valve sections also is movable to a position for directing air emanating from the first mentioned section rearwardly toward the channel and movable to another position for directing air emanating from the first mentioned section forwardly.
4. A vehicle as defined in claim 2, characterized to include:
   (F) rudder means movable for impeding the flow of air on one side of the channel and movable for impeding the flow of air on the opposite side of the channel;
   and further characterized to include:
   (G) and means for controlling the rudder means for effecting the results specified in (F).
5. A vehicle as defined in claim 2, characterized in that one of said valve sections (D) (1) comprises:
   (a) four valves disposed adjacent the rear opening of the first mentioned section;
   (b) means pivotally mounting said valves for movement independently of one another,
      (i) two of said valves being movable to a position for directing air emanating from the first mentioned section rearwardly and the other two valves being movable to a position for directing said air emanating from said first mentioned section forwardly;
   and further characterized in that said means (E) includes:
   (1) mechanism for moving said four valves independently of one another.
6. A vehicle as defined in claim 3, characterized to include:
   (F) rudder means movable for impeding the flow of air on one side of the channel and movable for impeding the flow of air on the opposite side of the channel;
   and further characterized in that said means (E) includes:
   (G) means for controlling the rudder means for effecting the results specified in (F).
7. A vehicle as defined in claim 1, characterized to include:
   (F) rudder means movable for impeding the flow of air on one side of the channel and movable for impeding the flow of air on the opposite side of the channel;
   and further characterized to include:
   (G) means for controlling the rudder means for effecting the results specified in (F).
8. A vehicle as defined in claim 7, characterized to include:
   (F) two rudders;
   (G) means for pivoting said rudders for movement independently of one another and about substantially horizontally extending axes; and
   (H) means for moving the rudders about their respective pivot means independently of one another.
9. A vehicle as defined in claim 8, characterized in that said axes of the rudders angle rearwardly toward one another.
10. A vehicle as defined in claim 5, characterized to include:
    (H) elongated sub-runners extending parallelly with the first mentioned runner, each of said sub-runners including:
       (1) two longitudinally extending vanes disposed at substantially ninety degrees of one another;
    (I) and means pivotally mounting said sub-runners parallelly with the first mentioned runners;
    (J) and means for shifting the sub-runners about the pivoted means therefor and for retaining the same in the shifted position.
11. A vehicle as defined in claim 1, characterized to include:
    (F) elongated sub-runners extending parallelly with the first mentioned runners;
    (G) and means pivotally mounting said sub-runners parallelly with the first mentioned runners;
    (H) and means for shifting the sub-runners about the pivoted means therefor and for retaining the same in the shifted position.
12. A vehicle as defined in claim 11, characterized in that each of said sub-runners (F) comprises:
    (1) two longitudinally extending vanes disposed at substantially ninety degrees of one another.

References Cited by the Examiner

UNITED STATES PATENTS

| 2,993,462 | 7/1961 | Gough. |
| 3,027,860 | 4/1962 | Priest. |

FOREIGN PATENTS

| 1,192,127 | 4/1959 | France. |
| 422,846 | 12/1925 | Germany. |

BENJAMIN HERSH, *Primary Examiner.*

M. S. SCALES, *Assistant Examiner.*